H. H. RUSSELL.
Improvement in Hoisting Attachments for the Shafts of Well-Augers.
No. 130,442.
Patented Aug. 13, 1872.
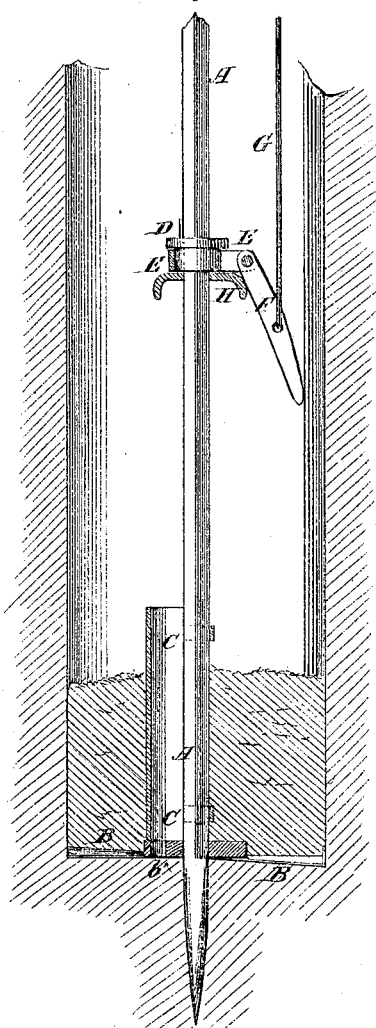
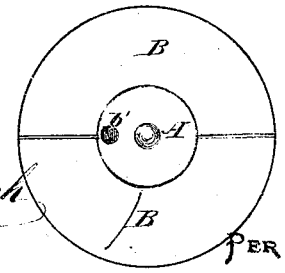

UNITED STATES PATENT OFFICE.

HENRY H. RUSSELL, OF MAYSVILLE, MISSOURI.

IMPROVEMENT IN HOISTING ATTACHMENTS FOR THE SHAFTS OF WELL-AUGERS.

Specification forming part of Letters Patent No. 130,442, dated August 13, 1872.

Specification describing a new and useful Improvement in Well-Augers, invented by HENRY H. RUSSELL, of Maysville, in the county of De Kalb and State of Missouri.

Figure 1 is a side view of my improved well-auger partly in section, to show the construction. Fig. 2 is a bottom view of the same.

Similar letters of reference indicate corresponding parts.

The invention consists in providing the shaft of auger with a collar, band, and pivoted arm, as hereinafter described.

A is the shaft by which the auger is operated, to the lower end of which is attached the boring-plate B. The end of the shaft A projects a little below the boring-plate B, and is pointed to serve as a centering point and guide to the auger in making its way into the ground. To the lower part of the shaft A, just above the plate B, is attached a tube, C, having hole $b'$, as shown in Fig. 1. D is a collar which is keyed or otherwise securely attached to the shaft A. The collar D is made with a strong flange around its upper end. Upon the collar D is placed an open band, E, to the ends of which is pivoted the end of an arm, F, to which arm is attached the lower end of the rope G, by which the auger is raised and lowered. The band E is kept from slipping down from the collar D by a guard, H, placed upon the shaft A. The arm F, when the auger is being turned, hangs down and thus keeps the rope from being wound upon the shaft A, so that it is always ready to raise the auger when required. When the rope G is pulled upon the arm F is brought against side of well.

Having thus described my invention, I claim as new and desire to secure by Letters Patent—

The combination of the collar D, band E, and pivoted arm F, with the shaft A of a well-auger to receive the hoisting-rope, substantially as herein shown and described, and for the purposes set forth.

HENRY H. RUSSELL.

Witnesses:
J. S. STEVENS,
J. D. ATTERBURG.